United States Patent
Russ et al.

[15] 3,655,107
[45] Apr. 11, 1972

[54] MOTORCYCLE MOUNTED FACE SHIELD HOLDER

[72] Inventors: Bobby L. Russ, Route #1, Kelly, N.C. 28448; Morris M. Schmidt, Route #1, Delco, N.C. 28436

[22] Filed: Dec. 15, 1969

[21] Appl. No.: 884,798

[52] U.S. Cl. .......................................... 224/30 A, 280/289
[51] Int. Cl. ............................................... B62j 11/00
[58] Field of Search................. 280/289; 296/78, 78.1, 78 A; 2/9, 8, 10; 224/30 R, 30 A

[56] References Cited

UNITED STATES PATENTS

| 1,369,585 | 2/1921 | Whitney | 296/78.1 |
| 3,189,918 | 6/1965 | Hiatt et al. | 2/9 |
| 3,369,836 | 2/1968 | Haycock et al. | 296/78.1 |

FOREIGN PATENTS OR APPLICATIONS

| 122,897 | 10/1927 | Switzerland | 296/78.1 |

*Primary Examiner*—Benjamin Hersh
*Assistant Examiner*—John A. Pekar

[57] ABSTRACT

A device enabling a motorcycle rider to carry his face shield with him at all times when he is riding his motorcycle. The device enables the user to snappably engage the face shield to the motorcycle mounting member and includes a U-shaped bar portion to which are attached mounting lugs for attachment to the handlebar mounting portion of the motorcycle.

1 Claim, 2 Drawing Figures

Patented April 11, 1972 3,655,107
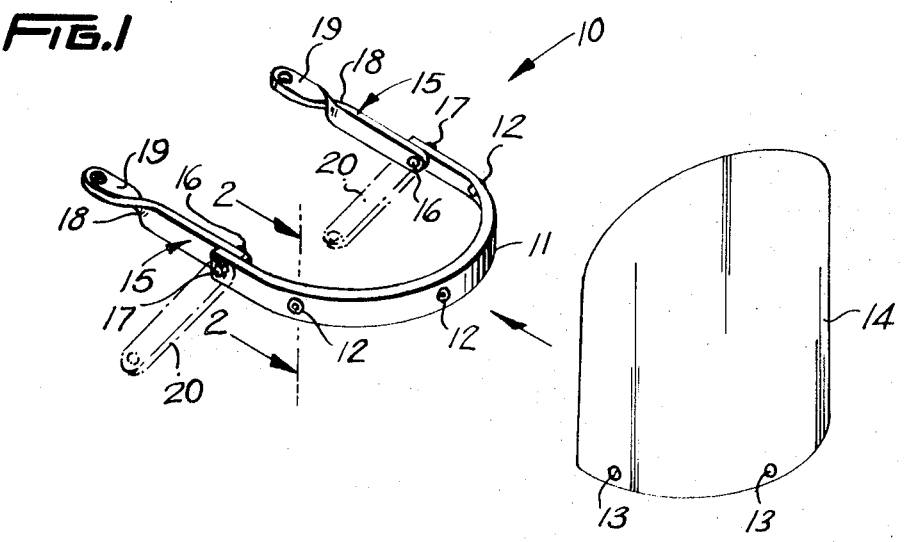
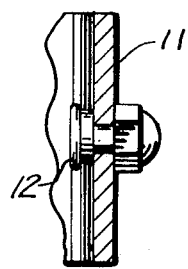
INVENTORS.
BOBBY RUSS
M.M.SCHMIDT

MOTORCYCLE MOUNTED FACE SHIELD HOLDER

This invention relates to motorcycle accessories, and more particularly to a face shield holding bracket.

It is the main object of the present invention to provide a motorcycle mounted face shield holder which will keep the rider's face shield readily available.

Another object of this invention is to provide a device of the type described which may be secured to the motorcycle by the bolts holding the handlebar onto the machine or may be secured by the bolts holding the headlight onto the machine.

A further object of this invention is to provide a face shield holder for motorcycles which will have snap fasteners on the U-shaped portion which will snappably engage the mating fasteners on the face shield thus holding the face shield in place until the rider is ready to use it.

Other objects of the present invention are to provide a motorcycle mounted face shield which is simple in design, inexpensive to manufacture, rugged in construction, easy to use and efficient in operation.

These and other objects will be readily evident upon a study of the following specification and the accompanying drawing wherein:

FIG. 1 is a perspective view of the present invention showing the rider's face shield disengaged from the device with secondary adapter member shown in phantom lines; and FIG. 2 is an enlarged cross sectional view taken along the line 2—2 of FIG. 1.

According to this invention, a motorcycle mounted face shield holder 10 is shown to include a flat U-shaped member 11 made of a non-corrosive material. Projecting from the exterior of the U-shaped member 11 are a plurality of spaced apart snap fasteners 12 which align with mating fasteners 13 secured to the rider's face shield 14.

A bracket 15 is secured to each end of member 11 by means of a bolt 16 and a nut fastener 17 and brackets 15 are provided with a twisted portion 18 enabling the flat portion 19 to be secured by bolts of the handle bar portion of the motorcycle (not shown).

In use, the face shield 14 when not in use is placed by the user so that the fasteners 13 of face shield 14 align with the fasteners 12 of member 11 and by applying pressure to face shield 14, it will cause the fasteners 13 to snappably engage the fasteners 12 thus rendering face shield 14 stationary and readily available to the rider when desired. When the rider desires to use the face shield 14 he merely grasps shield 14 and disengages the fasteners 13 from the fasteners 12 of U-shaped member 11.

It shall be noted that another adapter member 20, as shown in FIG. 1 of the drawing, may be used in place of the brackets 15 and thus mount face shield holder 10 to the machine.

What I now claim is:

1. A motorcycle mounted face shield holder comprising in combination a U-shaped flat member, snap fasteners carried by said U-shaped member providing a means of securing a rider's face shield there to, a pair of elongated brackets carried by said U-shaped member providing a means of securing said device to a motorcycle, said U-shaped member being provided with said snap fasteners which extend outwards of said U-shaped member on its exterior side so to engage with similar mating snap fasteners secured to a lower arcuate edge of said rider's face shield, thus when said rider's face shield is aligned with said U-shaped member and pressure applied to said face shield, it will snappingly engage said fasteners of said U-shaped member and will remain stationary and readily available to the rider for use, said U-shaped member being secured to said motorcycle by means of suitable nut and bolt fasteners, said nut and bolt fasteners being received within one end of said elongated brackets, said brackets having opening means at a twisted end allowing for receiving said bolt fasteners for attaching to the handle bar of said motorcycle.

* * * * *